US007281236B1

(12) United States Patent
Galvin et al.

(10) Patent No.: US 7,281,236 B1
(45) Date of Patent: Oct. 9, 2007

(54) SYSTEM AND METHODS FOR DEVELOPING AND DEPLOYING A REMOTE DOMAIN SYSTEM

(75) Inventors: Michaell A. Galvin, Foxboro, MA (US); James M. Apple, Pascoag, RI (US)

(73) Assignee: EMC Corporation, Hopkinton, MA (US)

( * ) Notice: Subject to any disclaimer, the term of this patent is extended or adjusted under 35 U.S.C. 154(b) by 716 days.

(21) Appl. No.: 10/675,016

(22) Filed: Sep. 30, 2003

(51) Int. Cl.
*G06F 9/44* (2006.01)
*G06F 9/445* (2006.01)

(52) U.S. Cl. .................. 717/104; 717/172; 717/173
(58) Field of Classification Search ........ 717/104–109, 717/173, 172
See application file for complete search history.

(56) References Cited

U.S. PATENT DOCUMENTS

| | | | |
|---|---|---|---|
| 6,324,681 B1* | 11/2001 | Sebesta et al. | 717/102 |
| 6,530,036 B1* | 3/2003 | Frey, Jr. | 714/6 |
| 6,601,233 B1* | 7/2003 | Underwood | 717/102 |
| 6,931,623 B2* | 8/2005 | Vermeire et al. | 717/108 |
| 6,990,653 B1* | 1/2006 | Burd et al. | 717/108 |
| 7,043,716 B2* | 5/2006 | Zimmer et al. | 717/107 |
| 7,065,740 B2* | 6/2006 | Westerinen et al. | 717/101 |
| 7,120,897 B2* | 10/2006 | Ebbo et al. | 717/108 |
| 7,171,647 B1* | 1/2007 | Smith et al. | 717/105 |
| 7,213,228 B2* | 5/2007 | Putterman et al. | 717/109 |
| 2001/0037490 A1* | 11/2001 | Chiang | 717/2 |
| 2003/0167456 A1* | 9/2003 | Sabharwal | 717/108 |
| 2004/0015832 A1* | 1/2004 | Stapp et al. | 717/106 |
| 2004/0133876 A1* | 7/2004 | Sproule | 717/105 |
| 2005/0015745 A1* | 1/2005 | Wain et al. | 717/105 |
| 2005/0071803 A1* | 3/2005 | Cherdron et al. | 717/101 |
| 2005/0125771 A1* | 6/2005 | Vitanov et al. | 717/104 |
| 2005/0154841 A1* | 7/2005 | Sastri et al. | 711/148 |
| 2006/0048107 A1* | 3/2006 | Thiagarajan et al. | 717/136 |
| 2006/0206864 A1* | 9/2006 | Shenfield et al. | 717/107 |
| 2006/0212843 A1* | 9/2006 | Zaky et al. | 717/106 |

OTHER PUBLICATIONS

Eun Sook Cho et al., Object-oriented Web application architectures and development strategies, IEEE, Dec. 1997 pp. 322-331.*

(Continued)

*Primary Examiner*—Wei Zhen
*Assistant Examiner*—Satish S Rampuria
(74) *Attorney, Agent, or Firm*—Chapin IP Law, LLC; Barry W. Chapin, Esq.

(57) ABSTRACT

Developing web interfaces to existing base applications encounter GUI screens involves translation from the native language into HTML (Hypertext Markup Language) to support operation from a web page in accessible by HTTP (Hypertext Transfer Protocol), as is common to Internet (web based) applications. Accordingly, such "webification" of a conventional application involves manual. An object translation mechanism allows a web server to invoke the base application via a web GUI by using a server runtime engine in the web server to generate transportable objects, corresponding to application objects, for transmission to a client runtime engine (Browser). The web server further receives return transportable objects and generates executable objects indicative of user input and commands. The executable objects, map the user inputs and objects to associated objects and external references in the web server application corresponding to the base application, and perform the manipulations and operations corresponding to the user input.

29 Claims, 8 Drawing Sheets

OTHER PUBLICATIONS

Xin et al., A component-based model of Web-enabled applications, IEEE, Sep. 1998 pp. 301-306.*

Ping et al., Websites that satisfy users: a theoretical framework for Web user interface design and evaluation, IEEE, vol. 2 1999 pp. 1-8.*

Mili et al., Reusing software: issues and research directions, IEEE, vol. 21, Issue: 6 Jun. 1995, pp. 528-562.*

Goodburn et al., Deploying systems visualisation environments: an agent-based approach, IEEE, Dec. 1999, pp. 26-29.*

Coupaye et al., Foundations of enterprise software deployment, IEEE, Feb. 2000, pp. 65-73.*

Arshad et al., Deployment and dynamic reconfiguration planning for distributed software systems, IEEE, Nov. 2003, pp. 39-46.*

* cited by examiner

SYSTEM AND METHODS FOR DEVELOPING AND DEPLOYING A REMOTE DOMAIN SYSTEM

BACKGROUND OF THE INVENTION

Conventional information processing systems are typically driven by computer-based applications having a user interface through which a user or operator enters commands and instructions, and receives feedback and results. Traditionally, input to such systems was via a command line interface, in which the user manually types entries. Character cell interfaces followed, in which a user employs a character cell screen addressable as an array of characters. Such character cell interfaces are the predecessors to modern Graphical Interfaces (GUIs). GUIs, such as the WINDOWS® line of operating system (OS) interfaces, are commonplace and employ multiple overlapping screen segments, or windows.

More recently, the proliferation of Internet based applications has prompted developers to migrate their GUIs to Internet based accessibility. Developers migrate applications formerly accessible via LAN, modem, or direct desktop interfaces to Internet-based interfaces by employing Transmission Control Protocol/Internet Protocol (TCP/IP) and Hypertext Transfer Protocol (HTTP) transport mediums.

With the modern proliferation of Internet usage for remote access, migration of conventional traditional GUIs to Internet implementations for providing such remote access is unlikely to diminish. Further, new application development seeks to modularize conventional user interfaces to allow integration flexibility and allow such conventional applications adaptability for deployment in a variety of environments, including accommodation for Local Area Networks (LANs), intranets, extranets, firewalls, and other deployment environments.

SUMMARY

Modern development techniques of information processing systems strive to achieve flexibility and modularity, particularly with respect to enabling a remote access GUI. Conventional computer-based applications support one or more user interfaces for interacting with a human user through a Human-Machine Interaction (HMI) interface, as is known to those of skill in the art. Retrofitting such a conventional traditional application for operation via a remote access GUI requires substantial effort.

In a traditional, conventional HMI, operations for obtaining and reporting user information are heavily integrated with the application, and therefore entail substantial design and development effort to redesign and recode references to a GUI. Therefore, an application upgrade effort to retrofit a conventional application with a new GUI, such as an Internet conversant GUI, typically triggers significant development resource investment.

In a conventional information processing system, a developer (typically a programmer or engineer) models the system as a set of deployment objects, typically software objects based on an object oriented design for deployment using an object-oriented language such as Java™ or C++ ("Java" is a registered Trademark of Sun Microsystems, Inc. of Santa Clara, Calif., for its web based programming language, as is known in the art). Such objects are executable on a conventional interpreter such as a runtime engine compatible with the language and responsive to the objects.

A developer models, develops, and deploys a set of such conventional objects as an application. Typically, a set of objects defining a particular conventional application employ a graphical user interface (GUI) operable from a user console for displaying and receiving information from a user or operator (user). The GUI provides the HMI interface to the conventional application, which ultimately performs a particular task, such as managing a data source or providing a service on behalf of the user.

The objects in the conventional base application integrate with the GUI, either via a toolkit, transport mechanism, or other software interface such that the user may manipulate the target service or data source and receive feedback through the conventional interface provided by the GUI screens to the base application. Often, such an interface is a static interface, in which the objects in the base application correspond to the particular GUI in operation on a console or other conventional user output device. Accordingly, converting the operation of the conventional base application to an alternate GUI interface may not be seamless. Redefining the objects in the conventional base application to correspond to a different HMI interface involves redesigning and/or retrofitting low level operations and instructions in the conventional application objects in a highly detailed manner to correspond to the new GUI. Typically such a conventional translation implies low level metalanguage modifications to map the objects to the new GUI by hand. Such low level porting requires substantial design effort and regressive testing, increasing cost and the risk of potential failure.

Nonetheless, a typical conventional or legacy application is often the subject of a port, conversion or translation to an Internet based web interface. Widespread popularity in Internet usage in recent years has driven motivation for establishing web interfaces to existing conventional base applications formerly driven by standalone desktop windows interfaces or modem-based dialup connections, for example. Developers of such applications typically encounter GUI screens which require translation from the native language into HTML (Hypertext Markup Language) to support operation from a web page accessible by HTTP (Hypertext Transfer Protocol), as is common to Internet (web based) applications. Accordingly, such "webification" of a conventional application involves porting, or translating, the base application (objects, source files, etc.) to a web server by manually hand-coding the relations between web-based HTML (metalanguage usage) constructs and application objects. Such a "webified" application is then available on the web server via an Internet browser application.

In particular, such a cumbersome design effort stems from an architecture approach based on a non-web design which employs a LAN based interface between the user and the conventional application. For example, in a SAN (Storage Area Network) management application, user interaction occurs via a user console for receiving and displaying commands and instructions with a user. Such a SAN management application monitors and controls SAN elements, such as storage devices, connectivity devices, and software agent component entities in a network for interconnecting a plurality of high-volume, high-speed, non-volatile mass storage devices. The SAN base application provides user monitoring and control of a database for storing a multitude of control information and parameters about the SAN elements and related entities in the SAN. In such a SAN for example, a web-based GUI upgrade involves an application developer or maintainer examining the conventional TCP/IP interface references between the user GUI console and the SAN base application and modifying the conventional interface references to use web based HTML references for remote Internet operation via a web server.

It would be beneficial, therefore, to employ a system and method for enabling translation and portability of a set of objects defining a base application to migrate the base application to an alternate platform such as a web-based GUI implementation. Further, it would be beneficial to define an application architecture having a set of objects with such properties so as to enable deployment on a variety of user interfaces from the same server runtime engine, thereby avoiding the need to manually redefine the GUI for alternate user display devices such as browsers, consoles, and local (windows desktop) interfaces.

A set of application objects fulfilling the above criteria allows a remote server, or web server, to invoke a web server application paralleling the functionality of the base application via a GUI, by using the server runtime engine in the web server to generate transportable objects, corresponding to application objects, for transmission to a client runtime engine having a web browser GUI. The web server further receives return transportable objects from the client runtime engine receivable by the server runtime engine to generate executable objects indicative of user input and commands. The web server then employs the executable objects resulting from the user input, maps the user inputs and objects to associated objects and external references in the web server application corresponding to the base application, and performs the manipulations and operations corresponding to the user input.

Embodiments of the invention, therefore, significantly overcome the shortcomings outlined above by providing an object development, translation and deployment mechanism which provides a server runtime engine operable to execute executable objects on a server, such as a web server, to generate transportable objects over a transport mechanism, such as HTTP. A remote client runtime engine driving the GUI receives the transportable objects to produce corresponding executable objects to display GUI elements and receives GUI inputs from the user. The client runtime engine then produces return transportable objects and transports the return transportable objects back to the server runtime engine.

One such application which can assist in converting software objects, such as Java™ objects, into transmission units operable for transmission via a public access network, is the Nexaweb Smart Client software platform, marketed commercially by Nexaweb Technologies, Inc., of Cambridge, Mass. The Nexaweb product purports to deliver a Client/Server experience over the Web. However, the Nexaweb platform does not appear to provide a high level object library, but rather retains the lower level metalanguage approach to manually map XML objects, therefore tending to mitigate automated or seamless integration with external servers and data repositories.

The server runtime engine receives and processes the return transportable objects to generate executable objects, and performs the corresponding service or data source manipulation, for example, called for by the user via the GUI. In this manner, the objects on the web server emulate the base application objects and interact with the GUI via the transportable objects generated by the client and server runtime engines, therefore providing an instantiation of the set of base application objects on the remote web server while interfacing with the user via the HMI interface driven by the client runtime engine. The runtime engine handles the metalanguage level details of driving the remote GUI client, while the application developer deals with the objects and corresponding classes.

In a particular configuration, the executable objects are Java™ objects and the server runtime engine is operable to generate transportable objects in XML, and transmit the XML documents to the remote client runtime engine for supporting a web based (Internet) GUI. The remote client employs a browser with the client runtime engine to support the web-based GUI. The transportable objects are XML using the XUL syntax (schema), as is known to those of skill in the art, to communicate with the web server, collectively forming the web application. The "instructions" in the transportable objects are therefore defined in terms of the metalanguage, in this case XUL as opposed to HTML.

The system, therefore, allows the application developer (programmer) to design and program the GUI strictly in Java™ using Java classes in order to express the view of the base application over the web. Developers need not think in terms of a metalanguage; they think in terms of high level objects (Java GUI classes). The result is a substantial departure from conventional methodologies which require applications to map their business objects to a metalanguage by hand. A programmer or developer creates high level GUI objects, which run as executable objects on the web server. Metalanguage encoded representations of the objects are transmitted to a remote client as transportable objects. From the GUI screens, responses and client requests are received and mapped back into the high level GUI objects at the server.

In further detail, in a particular configuration, the method of modeling, building and implementing a software application on a remote deployment corresponding to a base application, as disclosed herein, includes identifying a set of objects in the base application for inclusion in the remote deployment. The resulting remote deployment application is suitable to be operable by an alternate control path (i.e. the Internet connection to the browser). An object translator under the control of a developer or operator translates the identified set of objects into a set of remote application objects parallel to the objects in the base application. The identified set of objects, therefore, defines a graphical user interface operable to interact with the user via the remote application objects. The developer deploys the translated remote application objects on a remote server, such as the web server described further below. A server runtime engine in the remote web server generates, from the translated remote application objects, executable objects. The server runtime engine is operable to further generate transportable objects corresponding to the generated executable objects for transmission to the user. The transportable objects represent the metalanguage encoded representations of objects, which are operable to generate, via the alternate control path (remote GUI interface), GUI executable objects on a remote client runtime engine. The remote client runtime engine, typically the user's web browser, is responsive to the transportable objects to generate corresponding GUI executable objects at the client runtime engine to provide the remote GUI. The client runtime engine generates, or emulates, the GUI by decoding, in a manner complementary to the encoding at the web server side, the metalanguage encoded objects into corresponding executable objects, thereby providing the remote deployment GUI application for accessing the base application.

Translating the objects includes generating a corresponding remote application object for each identified object in the base application. A label mapper in the object translator generates the remote application objects, which are operable for execution in the remote deployment. The remote application objects, therefore, are a parallel object set of the base application executable on the remote web server. Such objects include GUI objects and processing objects. The GUI objects include functions and operations directed to displaying and gathering input from GUI screens. Accordingly, translating the base application objects includes determining, via an object classifier in the object translator, if the object is a GUI object or a processing object. If the object is a GUI object, an association manager generates a reference to the server runtime engine to indicate that the GUI object triggers generation of a corresponding transportable object. The GUI objects are responsible for producing GUI display elements such as GUI screens, GUI icons, GUI controls, GUI buttons and GUI selections.

The object translator includes an association manager for managing interrelations between the GUI display elements and the remote application objects. Accordingly, translating involves identifying associations between the remote application objects and the GUI display elements storing the associations in an associated object table. The association manager identifies and populates the associated object table for runtime correlation of GUI input and output data and corresponding remote application objects executing in the web server. Further, the associations may include associations between the remote application objects and external references in a data source. Such a data source is accessible from the base application via a data source interface. Accordingly, translating further identifies such references from the translated remote application objects into the data source. Such external references include various storage and processing operations such as calls to a SAN management server.

In such an exemplary SAN based implementation, the base application is a SAN management application, the data source is a SAN management server and the external references are indicative of a manageable entity in the SAN. The SAN management server operable to store and retrieve information about the manageable entities in the SAN. Therefore, the remote application corresponds to the SAN management application and provides a remote interface to the SAN management server by emulating the SAN management application.

In a particular implementation, the remote deployment includes a web server and a browser, in which the web server includes the translated objects and the server runtime engine and the browser includes the client runtime engine. The client and server runtime engines communicate via the alternate control path. The alternate control path, in an Internet deployment, is an API portal including an Internet connection. The exemplary Internet deployment includes a remote domain, referring to an alternate TCP/IP network domain, in which the web browser resides. The remote web server, however, resides in the same domain as the base application.

Translating the objects for deployment and execution on the web server includes determining, for each of the translated application objects, overloaded methods corresponding to GUI display elements. An overload parser in the object classifier parses the GUI objects and the corresponding display elements, and resolves style inconsistencies in the GUI display produced by the client runtime engine. The base application may employ overloaded methods, a practice common with Java™ and other object-oriented implementation languages. The overload parser resolves undetermined references to methods resulting from such overload practices.

Further, the base application may include compound display elements to provide certain artifacts on the GUI display screen. Accordingly, in order to emulate the look and feel of the base application, the translating determines base application objects employing compound GUI display elements, and computing an aggregation of unary display elements consistent with the determined compound GUI display elements. A display element validator then modifies the translated application object such that the client runtime engine employs the aggregated unary display elements.

As indicated in the example above, in a particular arrangement, the base application is a storage area network (SAN) management application and the data source is a SAN management server having a database of manageable entities (ME) for providing storage data services via the SAN. Each of the manageable entities in the SAN is therefore responsive to the SAN management application. The GUI elements refer to the SAN elements, in which the SAN elements further correspond to the manageable entities in the SAN and the transportable objects for reporting status of the manageable entities from corresponding agent components in the SAN. As indicated above, each displayed GUI element may refer to multiple SAN elements, depending on usage of expand/contract operations. Each of the agent components in the SAN corresponds to at least one manageable entity, in which the agent components are further responsive to the return transportable objects for managing the manageable entities in the SAN. Therefore, the remote web server application provides SAN management by transporting transportable objects from the server runtime engine to the client runtime engine supporting the GUI, and responding with response runtime objects directing the agent components for facilitating SAN management.

Accordingly the associations in the associated object table are further indicative of relationships between screen display elements and the executable objects in the server runtime engine, and also indicative of relationships between manageable entities indicated in the SAN management server database, or data source in the exemplary configuration described above.

The invention as disclosed above is described as implemented on a computer having a processor, memory, and interface operable for performing the steps and methods for deploying a remote deployment system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java™ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide an object development, translation and deployment mechanism which deploys a server runtime engine operable to execute executable objects on a web server, to generate transportable objects over a transport mechanism, such as HTTP. A remote client runtime engine driving the GUI receives the transportable objects to produce corresponding executable objects to display GUI elements via the browser and receive GUI inputs from the user. The client runtime engine then generates return transportable objects and transports the return transportable objects back to the server runtime engine.

The server runtime engine receives and processes the return transportable objects to map back to executable objects, and performs the corresponding service or data source manipulation, for example, called for by the user via the GUI. In this manner, the objects on the server emulate the set of base application objects and interact with the GUI via the transportable objects generated by the client and server runtime engines, therefore providing an instantiation of the set of base application objects on the remote server while interfacing with the user via the HMI interface driven by the client runtime engine. The runtime engine handles the metalanguage level details of driving the remote GUI client, while the application developer deals with the high level objects and corresponding classes.

In a particular exemplary configuration, the executable objects are Java™ objects and the server runtime engine is operable to generate transportable objects in XML, transmit the XML documents to the remote client runtime engine for supporting a web based (Internet) GUI. The remote client employs the browser with the client runtime engine to support the web-based GUI. The transportable objects are XML using the XUL syntax (schema), as is known to those of skill in the art, to communicate with the web server, collectively forming the web application. The "instructions" in the transportable objects are therefore defined in terms of in a metalanguage, in this case XUL as opposed to HTML.

The system, therefore, allows the application developer (programmer) to design and program the GUI in Java™ in order to express the view of the base application over the web. Developers need not think in terms of a metalanguage; rather they think in terms of high level objects (Java GUI classes). The result is a substantial departure from conventional methodologies which require applications to map their business objects to a metalanguage by hand. A programmer or developer creates high level GUI objects, which run as executable objects on the server. Meta-language encoded representations of the objects are transmitted to a remote client as transportable objects. From the GUI screens, responses and client requests are received and mapped back into the high level GUI objects at the server.

Figure 1:
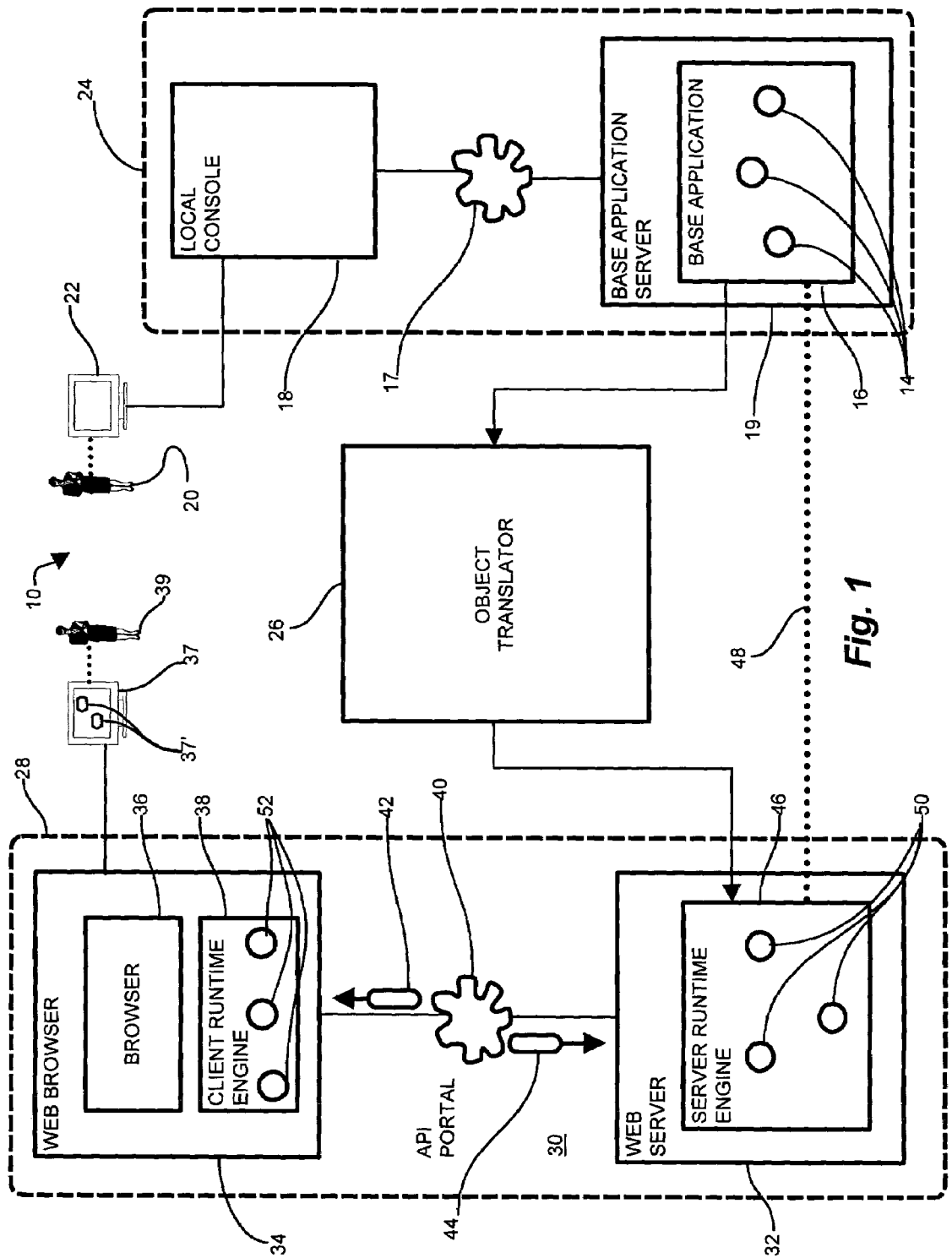
FIG. 1 is a block diagram of a computer system suitable for use with the present invention.

FIG. 1 is a block diagram of a computer system suitable for use with the present invention. Referring to FIG. 1, the system 10 includes a base application 16 having a set of objects 14, a linkage 17 to a local console 18 for operation of the base application by a user 20 via a local GUI 22, all within a local deployment, as indicated by the dotted line 24. A remote deployment 28 encapsulates a web application 30, including a web server 32, a web client 34, an API portal 40 operable to transport transportable objects 42 and return transportable objects 44, and a remote GUI 37 operable by a remote user 38. The web client 34 further includes a browser 36 and a client runtime (RT) engine 38 having executable GUI objects 52. The web server 32 further includes a server runtime engine 46 having translated objects 50, and a data source interface 48 to the base application 16. An object translator 26 is in communication with the base application 16 and the web server 32 for application translation and deployment, as will now be discussed with respect to FIGS. 2 and 3.

In operation, the object translator 26 receives application objects 14 from the base application 16, and translates the objects 14 into translated objects 50 executable on the server RT engine 46. The server RT engine 46 operates to generate the transportable objects 42 for transmission to the web client 34 via the API portal 40. The client RT engine 38 receives the transportable objects 42 and generates executable GUI executable objects 52. The browser 36 is responsive to the GUI executable objects 52 and receives user responses from the GUI 37. The client RT engine 38 generates return transportable objects 44 from the user responses, and the server RT engine 46 generates corresponding executable objects 50 from the return transportable objects 44. The server RT engine 46 executes the executable objects 50 to manipulate the base application 16 via the data source interface 48, in a manner similar to that provided by the local console 18 via the corresponding local GUI 22, as per the user 39 commands.

Figure 2:
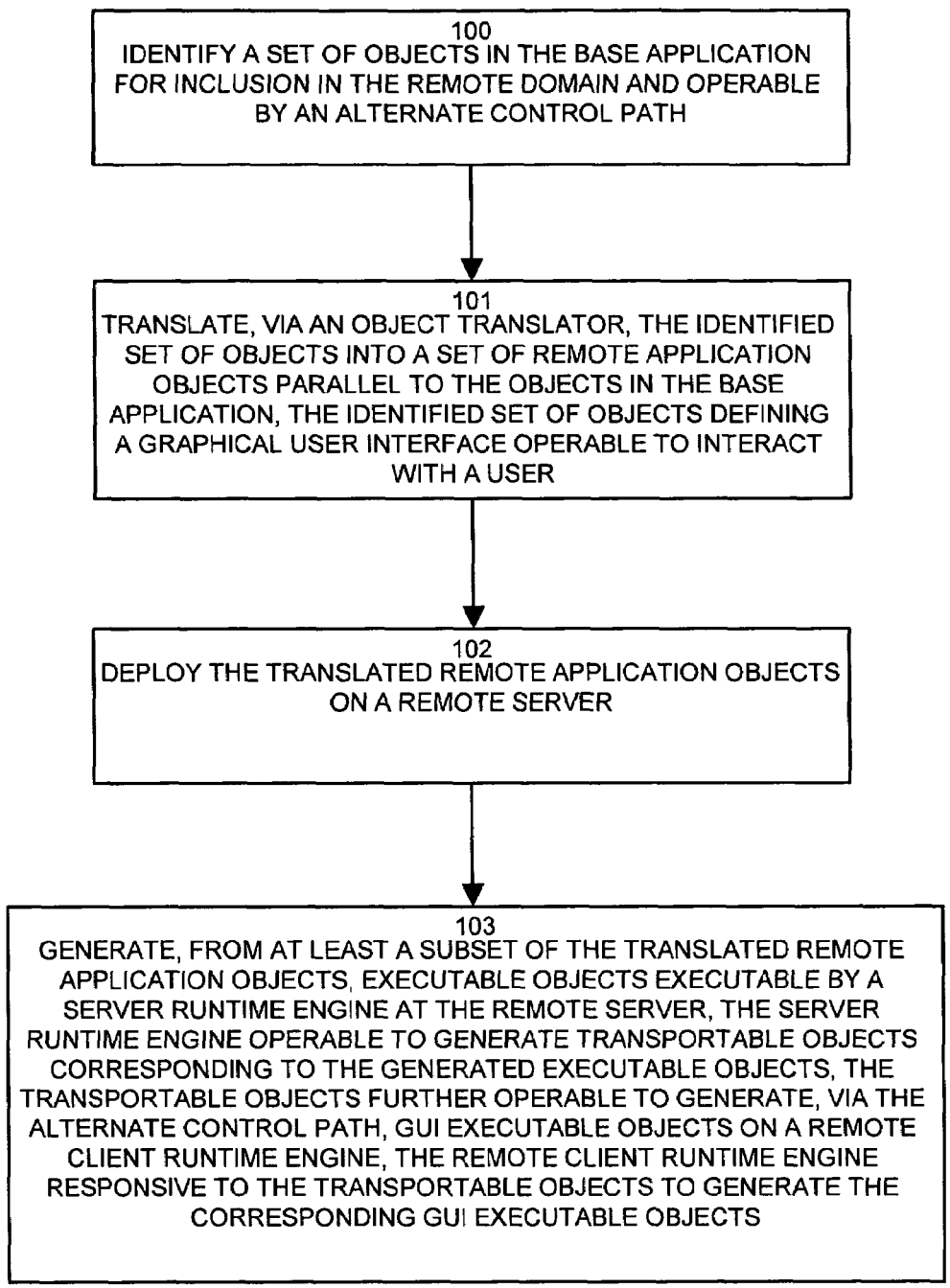
FIG. 2 is a flowchart for translating a base application to a remote deployment system.

FIG. 2 is a flowchart for translating a base application to a remote deployment system. Referring to FIG. 2, the method of modeling, building and implementing a software application on a remote deployment corresponding to a base application as on the system in FIG. 1 is disclosed. At step, 100 a label mapper in the object translator 26 identifies a set of objects 14 in the base application 16 for inclusion in the remote deployment 28 and operable by an alternate control path (40, 48). At step 101, the object translator 26 translates the identified set of objects 14 into a set of remote application objects 50 parallel to the objects in the base application 16, the identified set of objects 50 defining a graphical user interface 37 operable to interact with a user. The object translator 26 therefore creates a parallel set of objects 50 which collectively define an alternate application 30 for operating and controlling functions and operations similar to the operation of the base application 16, but via the GUI 37 of the remote deployment.

At step 102, the object translator 26 deploys the translated remote application objects 50 on the web server 32 for execution. At step 103, the server runtime engine 46 on the web server 32 generates executable objects from at least a subset of the translated remote application objects. The server runtime engine 46 operates as an interpreter, or, alternatively, as a compiler and loader, to execute the executable objects 50. The server runtime engine 46 further generates transportable objects 42 corresponding to the executable objects 50. The transportable objects 42 are further operable to generate, after transmission over the alternate control path defined by the API portal 40, GUI executable objects 52 on the remote client runtime engine 38 at the web client 34. The remote client runtime engine 38 is responsive to the transportable objects 42 to generate the corresponding GUI executable objects 52 for producing and gathering GUI display elements and user 38 input, respectively. The client runtime engine 38 returns the user data from the GUI 37 in return transportable objects 44.

Figure 3:
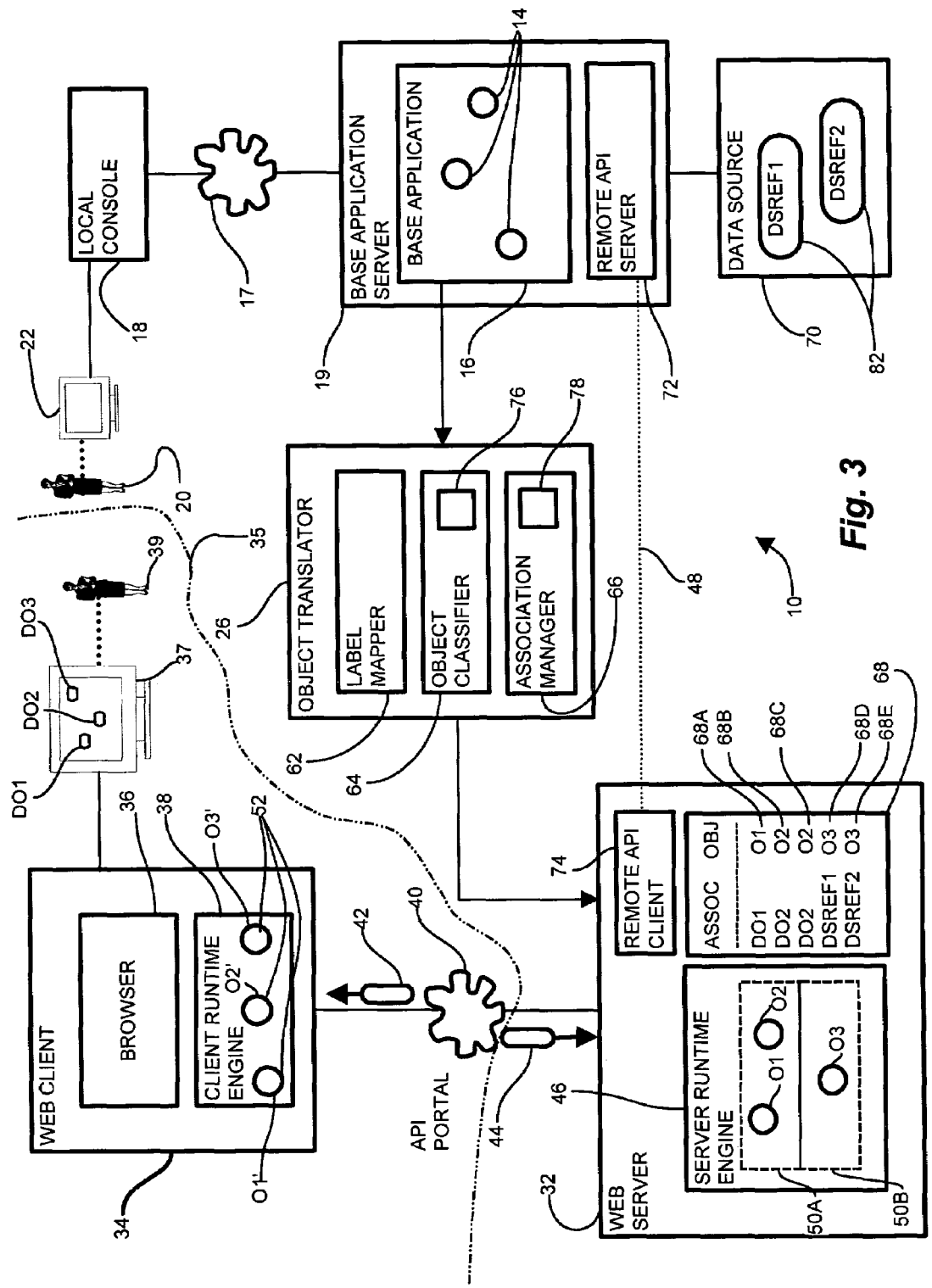
FIG. 3 shows the deployment of a remote deployment system on the computer system of FIG. 1 in greater detail.
Figure 4:
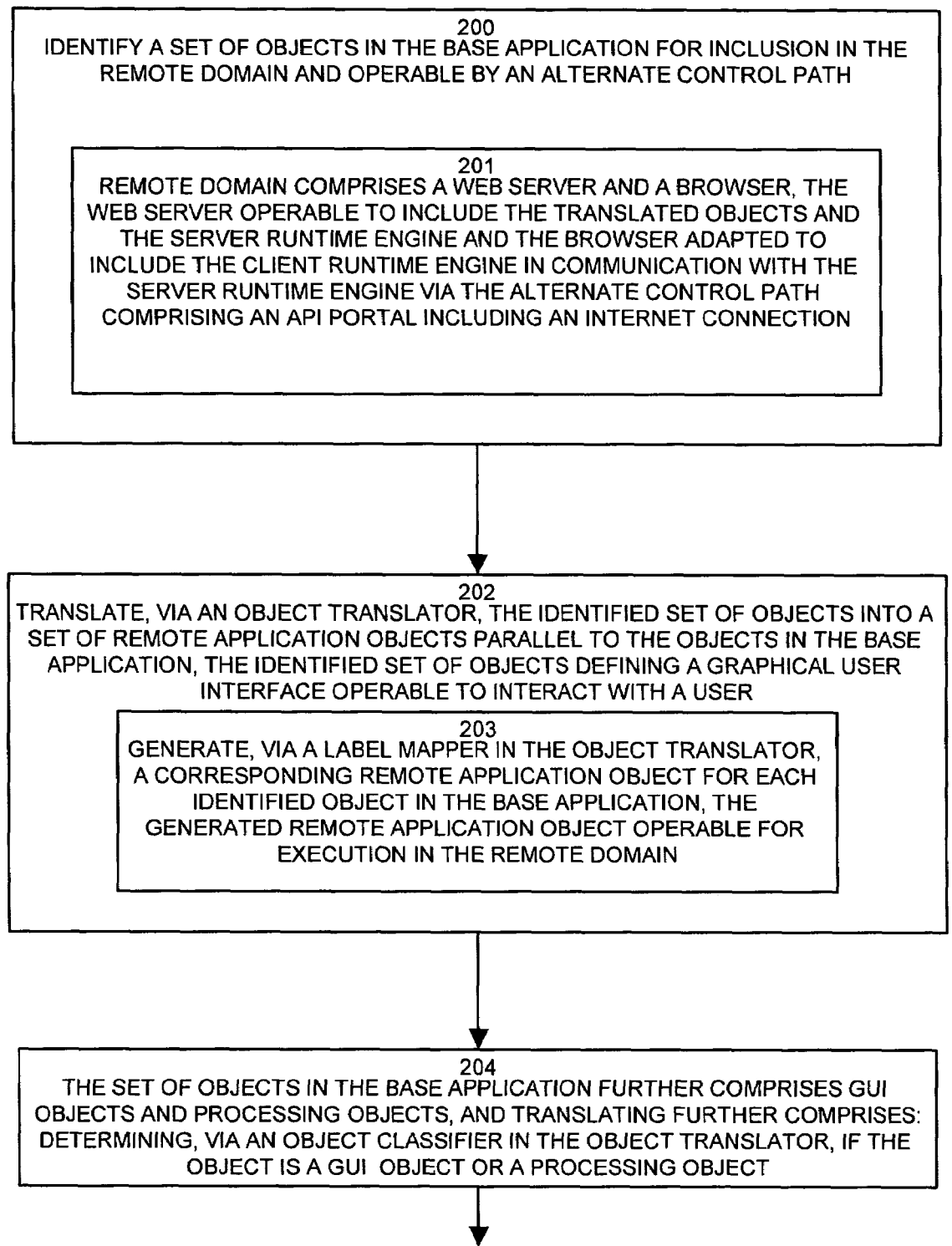
FIGS. 4-7 are a flowchart of transporting and deploying an application to a remote deployment as in FIG. 2 in greater detail.

FIG. 3 shows the deployment of a remote deployment system on the computer system of FIG. 1 in greater detail. Referring to FIGS. 1 and 3, the object translator 26 includes a label mapper 62, an object classifier 64, and an association manager 66. The web server 32 further includes an object table 68 and a remote API client 74. The base application server 19 includes the base application 16, a remote API server 72 connected to the remote API client 74 via the data source interface 48, and is further connected to the data source 70. As discussed above, a remote domain 35 includes the remote web client 34, in communication with the remote web server 46 in the local domain. Both the remote web server 46 and the remote web browser 34 are included in the remote deployment 28 defining the remote application 30.

In operation, the object translator 26 employs the label mapper 62 to generate a parallel instantiation (copy) of the set of objects 14 defining the base application 16. The object translator therefore creates a parallel set of remote application objects 50 for operation via the remote GUI 37. The object classifier 64 identifies, for each object 14 selected by the label mapper 62, whether the object operates on or is responsive to the GUI 37. Objects concerned with the GUI 37 integrate with the server runtime engine 46 for generating transportable objects 42. Objects 14 which do not communicate with the GUI are processing objects which may operate on the base application 16 and/or the data source 70 via the data source interface 48. As will be discussed further below, based on the object classifier 64, such GUI objects integrate with the server runtime engine 46, while processing objects 14 integrate with the remote API client 74. Note that a particular object 14 may integrate with both the server runtime engine 46 and the remote API client 74 if it communicates with both. The association manager 66 identifies associations between the translated objects 50 and other components, such as screen display elements 37' on the GUI 37 and external references 82 in the data source 70, for example.

The object table 68 in the web server 32 stores the associations 68A-68E (68 generally) identified by the association manager 66. For example, display element DO3 corresponds to executable object O2, as shown by entry 68C. Similarly, executable object O3 corresponds to data source reference DSREF1, as shown by entry 68D. The object table 68 maintains such dynamic relations between the executable objects 50 and other components.

The remote API client 74 is in communication with the remote API server 72 in the base application server 19 via the data source interface 48. The data source interface 48 connects the external data source 70 to the remote server 32 for receiving commands therefrom. However, such an interface 48 is called for by the base application 16, and, accordingly, the web server 32 employs the data source interface 48. Alternate configurations which do not employ a data source 70 may not need the external references 82 and hence, may not employ such an interface 48.

FIGS. 4-7 are a flowchart of transporting and deploying an application to a remote deployment as in FIG. 2 in greater detail. At step 200, the object translator 26 identifies a set of objects 14 in the base application 16 for inclusion in the remote deployment 28 and operable by an alternate control path (40, 48, discussed further below).

At step 201, the remote deployment 28 includes a web server 32 and a web client 34 having a browser 36. The web server 32 includes the server runtime engine 46 and the web client 36 includes the client runtime engine 38 in communication with the server runtime engine 46 via the API portal 40. The API portal 40 includes an Internet connection for remote operation of web server runtime engine 46, which executes the translated objects 50 derived from the base application 16.

At step 202, the object translator 26 translates the identified set of objects into the set of remote application objects 50 parallel to the objects 14 in the base application 16. The identified set of objects 50 therefore define the remote GUI 37 operable to interact with the user 38.

At step 203 the label mapper 62 in the object translator 26 generates a corresponding remote application object 50 for each identified object 14 in the base application 16. As indicated above, the generated objects aggregately form the set of translated remote application objects 50 operable for execution in the remote deployment 28.

At step 204, set of objects 14 in the base application 16 further include GUI objects 50A and processing objects 50B. The GUI objects include references, operations, and functions concerned with the GUI 37 display elements. The GUI objects link to the server runtime engine 46 in such a manner so as to employ the API portal 40 for remote access via the browser 36. Accordingly, an object classifier 64 in the object translator 26 determines if the object is a GUI object 50A or a processing object 50B. At step 205, the object classifier 64 performs a check to determine if the object 50 is a GUI object 50A or a processing object 50B. At step 206, depending on the outcome of the check at step 205, if the object 50 is a GUI object 50A, the object classifier 64 generates a reference to the server runtime engine 46 to indicate that this object 50A employs the API portal 40 communicate with the user 38 via the browser 37.

At step 207, for the determined GUI objects 50A, an association manager 66 identifies, the GUI display elements 37' which the GUI objects are responsible for producing. The various GUI display elements may include, but are not limited to, GUI screens, GUI icons, GUI controls, GUI buttons and GUI selections. The GUI display elements 37' are graphical display elements which the GUI 37 displays for visual observation and/or input by the user 38. At step 208, the association manager 66 stores the associations between the remote application objects 50A and the GUI display elements in an associated object table 68. The associations 68A-68E, therefore, are indicative of relationships between screen display elements 37' and executable objects 50A in the server runtime engine 46. The object table 68 allows mapping of user 38 input back to the object 50A requesting the input so that the runtime engine 46 may correlate the information from the API portal 40.

At step 209, the association manager identifies relationships that are indicative of associations between the remote application objects and external references in a data source. As discussed above, in an exemplary configuration employing a SAN management application as a data source 70, at step 210, the association manager 66 determines associations that are further indicative of relationships between manageable entities indicated in the SAN management server database, discussed below with respect to FIG. 8. Therefore, the association manager 66 correlates remote application objects 50 and external data source 70 entities.

At step 211, the base application 16 is a storage area network (SAN) management application and the data source is a SAN management server having a database of manageable entities (ME) for providing storage data services via the SAN, discussed further below. The manageable entities are responsive to the SAN management application, and display GUI elements including SAN elements corresponding to the manageable entities in the SAN. In the exemplary SAN configuration, the transportable objects 42, 44 are for reporting status of the manageable entities from corresponding agent components in the SAN, in which the agent components manage the manageable entities and are responsive to the return transportable objects for managing the manageable entities in the SAN.

At step 212, the association manager 66 stores the identified associations in the associated object table 68.

At step 213, translating the base application 16 further encompasses a data source interface 48 to the external data source 70. The data source 70 is responsive to the corresponding object 50 reference in the web server 32 for control and management thereof. Accordingly, translating includes identifying the object references from the translated remote application objects 50 into the data source 70. At step 214, the base application 16 is a SAN management application 16' (FIG. 9, below), the data source 70 is a SAN management server 70' and the external references are indicative of a manageable entity 82 in the SAN. Therefore, identifying the references involves identifying the manageable entities in the SAN and the corresponding remote application objects 50 at the web server 32 which manage the respective manageable entities. In this manner, the SAN management server is operable to store and retrieve information about the manageable entities in the SAN.

In alternate implementations, the associated object table 68 may encompass alternate forms or data structures. For example, multiple tables may be used, such as one for mapping associations from the GUI display elements 37' to the executable objects 50, and another table to map the external references 82 in the data source 70 to the executable objects. Alternatively, a data source 70 and associated data source interface 48 may not be included, depending on the base application 16 undergoing translation. Other implementation details and modifications thereto will be apparent to those of skill in the art.

At steps 215-223, the base application 16 has additional operations and functions having different behavior at the web server 32 than at the base application server 19. Accordingly, the object translator 26 selectively modifies the remote application objects 50 for appropriate operation in the server runtime engine 46. At step 216, translating includes determining overloaded methods corresponding to GUI display elements. Certain implementation languages for implementing the objects, such as Java™ and c++, employ overloaded methods, or functions, which allows invocation from among multiple similarly named methods to match the type of data passed to the operation in the object 14. An overload parser 76 in the object classifier 64 determines, for each of the translated application objects 50, inconsistent or improper overload references. Such an improper overload reference may include, for example, an overloaded method which receives the incorrect object having data items, or attributes, which are better handled by another method. Display anomalies or inconsistencies may result from such inappropriate overload usage, such as invoking a display element 37' in an alternative style or color by the client runtime engine 38.

At step 217, a check is performed to determine overloaded methods resulting in inconsistencies from the objects parsed in step 216. At step 218, the overload parser 76 resolving style inconsistencies in the GUI display 37 produced by the client runtime engine 38, from the overloaded GUI objects 50A.

At step 218, translating further includes determining base application objects 50 employing overloaded GUI display elements. At step 219, a display element validator 78 performs a check to determine if there are GUI display objects 50A which employ overloaded display elements. Developers may employ such overloaded display elements in the base application 16 to produce a visual result which is not obtainable with a single atomic display element type, enumerated above. However, such overloaded display elements may not operate appropriately via the client runtime engine 38. In response, the compound elements 37' allow the overloaded display elements to map properly.

At step 220, for the remote application GUI objects 50A found to invoke overloaded display elements, the display element validator 78 computes an aggregation of unary display elements to generate a compound display element 37' consistent with the determined overloaded GUI display elements to enable the translated remote application objects 50A to produce a similar result. At step 221, the display element validator 78 modifies the objects found at step 219 such that the translated application objects 50A cause the client runtime engine 38 to employ the aggregated unary display elements.

At step 222, the object translator 26 deploys the translated remote application objects 50 on the remote web server 32 for execution as executable objects 50 on the server runtime engine 46. At step 223, in the exemplary SAN configuration, the server runtime engine subsequently generates, from the translated remote application objects, executable objects, in which the server runtime engine 46 is operable to generate transportable objects 42 corresponding to the executable objects 50. When transmitted to the client runtime engine 38 via the API portal 40, the transportable objects 42 are further operable to generate corresponding GUI executable objects 52 on the remote client runtime engine 38. Accordingly, the remote client runtime engine 38 is responsive to the transportable objects 42 to generate the corresponding GUI executable objects 52 to produce the display elements 37' on the GUI 37 according to the translated remote application objects 50.

In this manner, the translated remote application objects 50 running as a remote application 30 present an alternative user view on the remote deployment 28. The web application produces a GUI similar to the base application 16, although driven via an alternate control path including the API portal. The application 30, therefore, produces similar results and control options enabling the user to manipulate the remote data source 70, in the exemplary case a SAN management application discussed herein by way of example only, as the corresponding base application enables through the local console 18.

Figure 5:
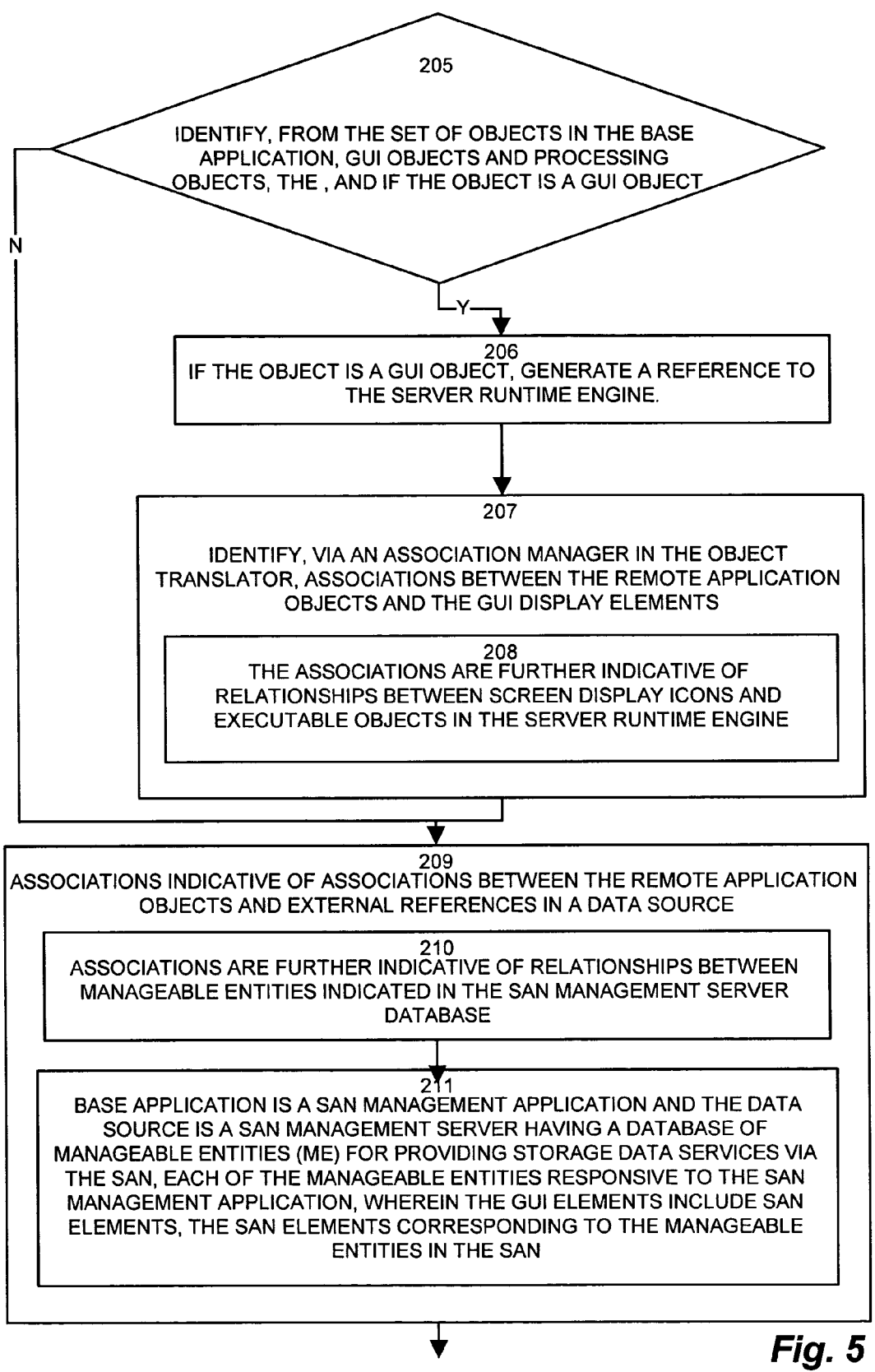
Figure 6:
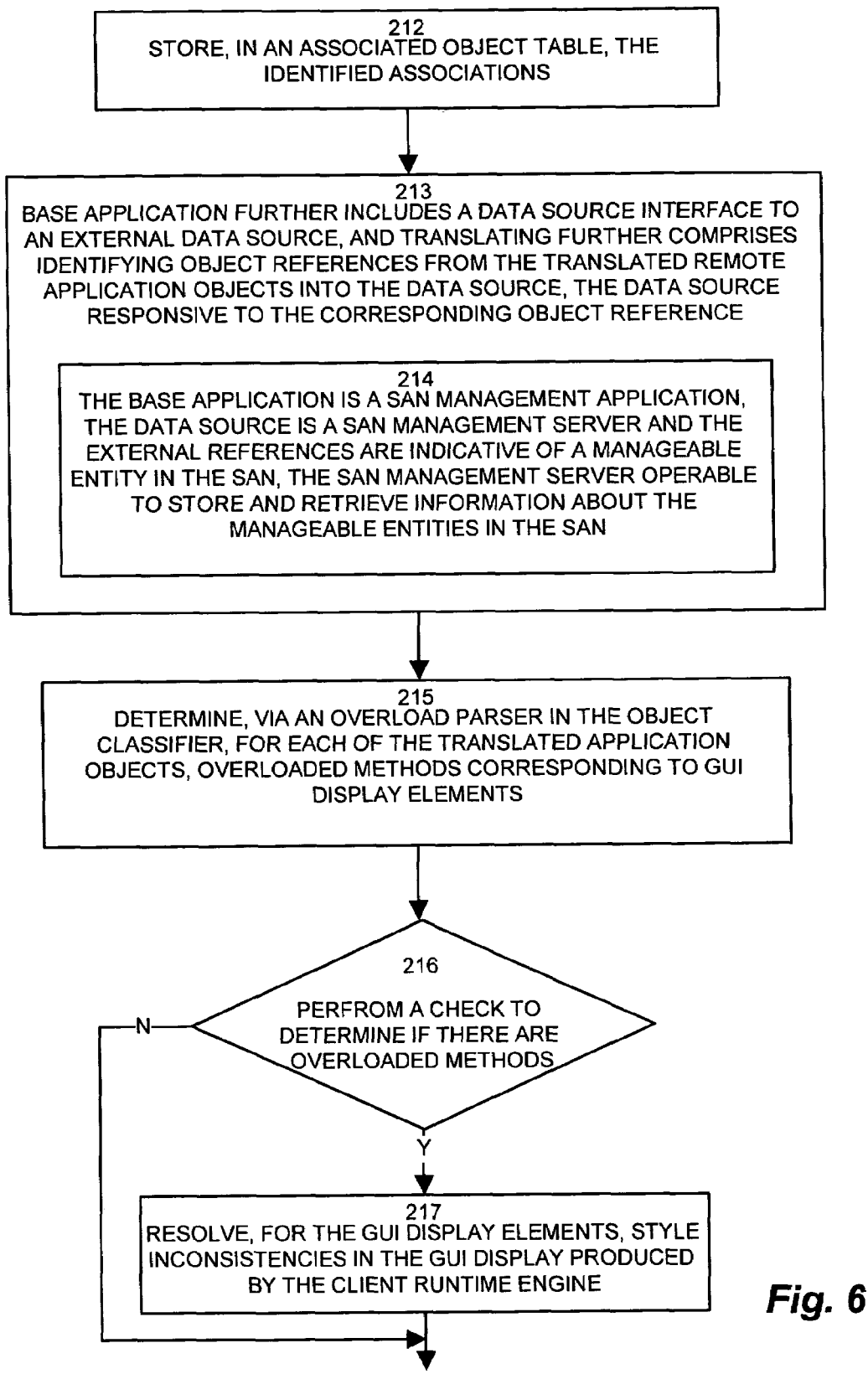
Figure 7:
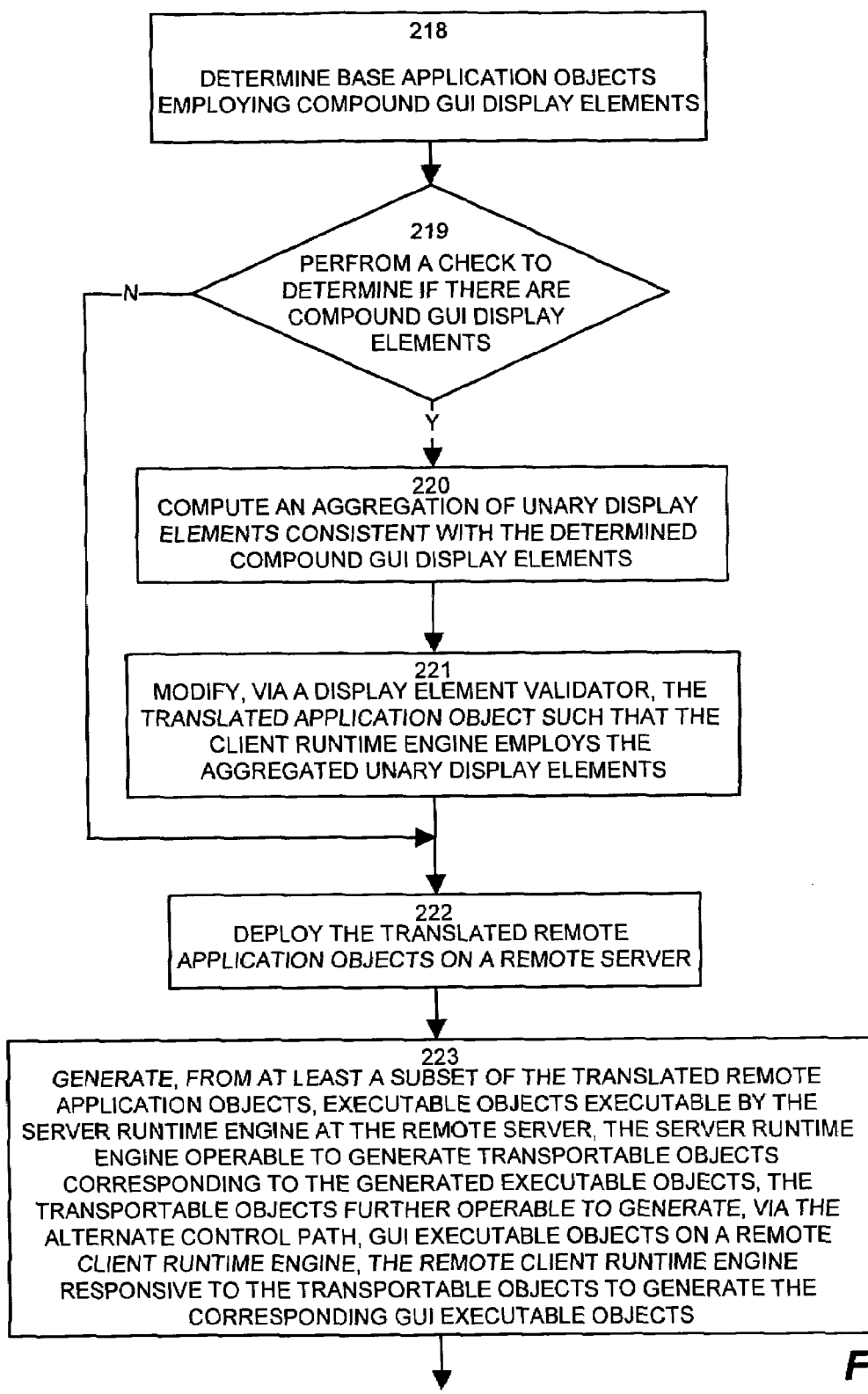

Referring now to FIGS. 3 and 5, the associations between the executable objects 14, the GUI display elements and the external references in the data source 70 are shown in more detail. FIG. 5 shows SAN nodes, including the SAN management server 70' operating as a data source 70, the SAN management application 16' operating as the base application 16, and the SAN console 18' operating as the local console 18 and connected via a SAN link 17.' The association table 68 stores the associations 68 as a set of entries 68A-68N. The GUI display 37 shows display objects DO1, DO2 and DO3. Such display objects may be indicated in the transportable objects 40 returned to the web server 32. The server runtime engine 46 then employs the association table 68 to determine the corresponding executable object 14 for each display object DO1, DO2, and DO3. In the exemplary configuration shown, DO1 is associated with GUI executable object O1, and DO2 and DO3 associate with GUI executable object O2, as shown by entries 68A, 68B, and 68C, respectively. Similarly, processing object O3 is associated with DSREF1 and DSREF2 in the data source 70, as shown by entries 68D and 68E. The exemplary association table 68 shown is illustrative. Alternate configurations may employ other mechanisms for mapping display objects 80, executable objects 14, and external reference objects 82

Figure 8:
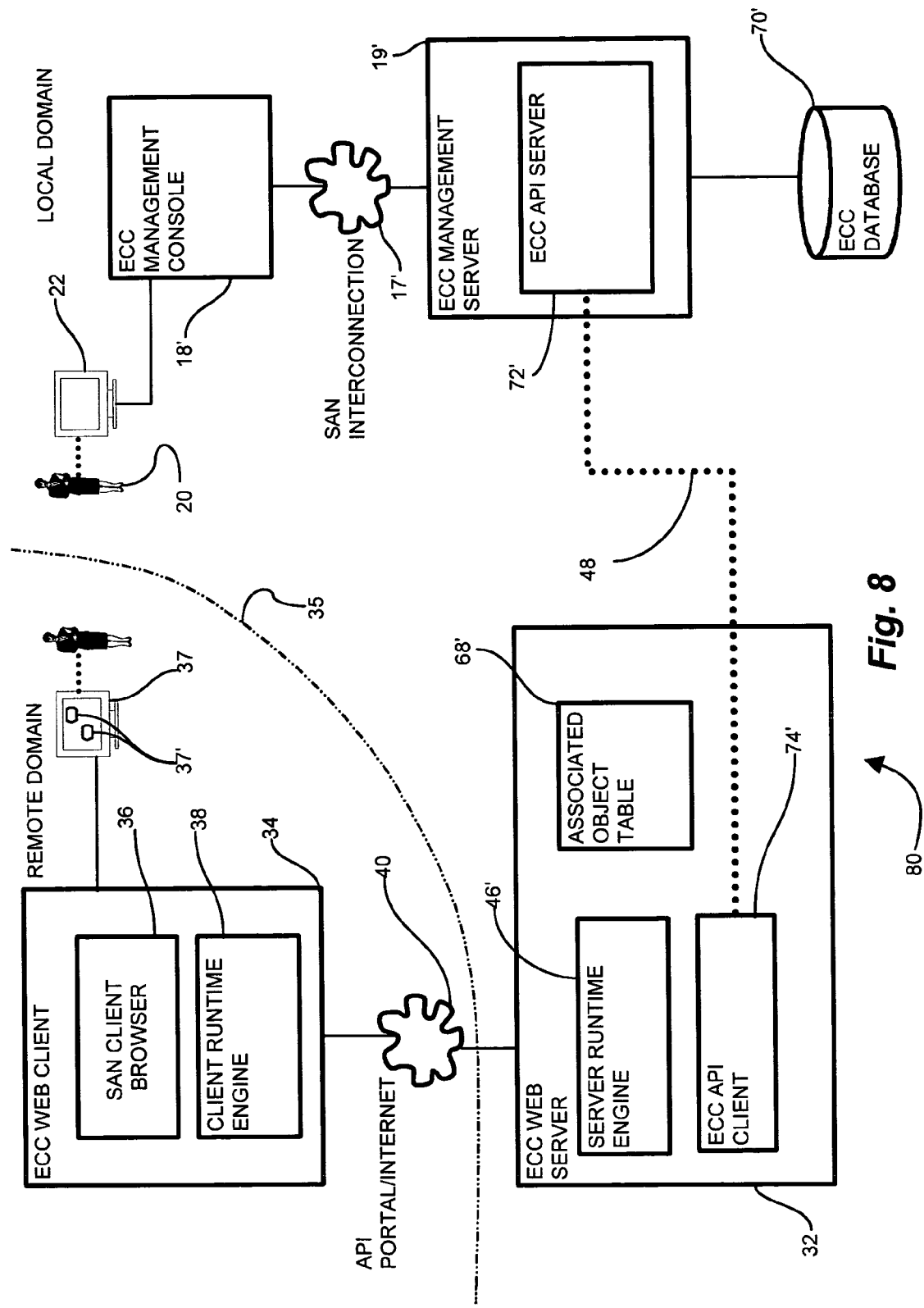
FIG. 8 shows an exemplary deployment of a Storage Area Network (SAN) management application.

FIG. 8 shows an exemplary deployment of a Storage Area Network (SAN) management application. Referring to FIGS. 1, 3 and 8, such an exemplary SAN management application may be the EMC Control Center application (ECC), marketed commercially by EMC corporation of Hopkinton, Mass., assignee of the present application. Describing now the exemplary translation of the SAN management application, the base application 16 is an ECC management server 16' coupled to an ECC database 70' providing an external data source and an ECC management console 18' for providing the GUI interface. An ECC web server 32' and an ECC web client 34' provide the remote web application 30 in the remote deployment 28. The ECC web server 32' includes an ECC API client 74' in communication with the ECC API server 72' at the ECC management server 19.' A server runtime engine 46' coupled to a client runtime engine 38 via the Internet/API portal 40' provide translation of executable objects into transportable objects. In the particular implementation shown, the executable objects are Java GUI objects and the transportable objects are XML documents, or files as described above.

Those skilled in the art should readily appreciate that the programs and methods for deploying a remote deployment system as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for deploying a remote deployment system has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of modeling, building and implementing a software application on a remote deployment system corresponding to a base application comprising:
   identifying a set of objects in the base application for inclusion in the remote deployment and operable by an alternate control path;
   translating, via an object translator, the identified set of objects into a set of remote application objects parallel to the objects in the base application, the identified set of objects defining a graphical user interface operable to interact with a user;
   wherein translating comprises generating, via a label mapper in the object translator, a corresponding remote application object for each identified object in the base application, the generated remote application object operable for execution in the remote deployment;
   deploying the translated remote application objects on a remote server; and
   generating, from at least a subset of the translated remote application objects, executable objects executable by a server runtime engine at the remote server, the server runtime engine operable to generate transportable objects corresponding to the generated executable objects, the transportable objects further operable to generate, via the alternate control path, GUI executable objects on a remote client runtime engine, the remote client runtime engine responsive to the transportable objects to generate the corresponding GUI executable objects, the set of objects in the base application further comprising GUI objects and processing objects, translating further comprising:
   determining, via an object classifier in the object translator, if the object is a GUI object or a processing object; and
   if the object is a GUI object, generating a reference to the server runtime engine.

2. The method of claim 1 further comprising identifying, from the set of objects in the base application, GUI objects and processing objects, the GUI objects responsible for producing GUI display elements including at least one of GUI screens, GUI icons, GUI controls, GUI buttons and GUI selections.

3. The method of claim 2 wherein translating further comprises:
   identifying, via an association manager in the object translator, associations between the remote application objects and the GUI display elements; and
   storing, in an associated object table, the identified associations.

4. The method of claim 3 wherein the associations are further indicative of associations between the remote application objects and external references in a data source.

5. The method of claim 3 wherein the associations are further indicative of relationships between GUI elements and the executable objects in the server runtime engine.

6. The method of claim 4 wherein the associations are further indicative of references between manageable entities indicated in the SAN management server database.

7. The method of claim 1 wherein the base application further includes a data source interface to an external data source, and translating further comprises identifying object references from the translated remote application objects into the data source, the data source responsive to the corresponding object reference.

8. The method of claim 7 wherein the base application is a SAN management application, the data source is a SAN management server and the external references are indicative of a manageable entity in the SAN, the SAN management server operable to store and retrieve information about the manageable entities in the SAN.

9. The method of claim 7 wherein the base application is a storage area network (SAN) management application and the data source is a SAN management server having a database of manageable entities (ME) for providing storage data services via the SAN, each of the manageable entities responsive to the SAN management application and further wherein the GUI elements represent SAN elements, the SAN elements corresponding to the manageable entities in the SAN and the transportable objects for reporting status of the manageable entities from corresponding agent components in the SAN, each of the agent components corresponding to at least one manageable entity, the agent components further responsive to the return transportable objects for managing the manageable entities in the SAN.

10. The method of claim 9 wherein the SAN management application is operable to correlate a plurality of manageable entities with a plurality of agent components, each of the manageable entities and agent components having a corresponding executable object in the set of objects in base application, wherein translating further comprises:
 identifying objects in the base application corresponding to the operator console;
 identifying objects in the base application corresponding to the data source, the data source further comprising a control center (CC) database operable to store information corresponding to each of the manageable entities according to a predetermined hierarchy defined in the base application;
 copying the identified objects in the base application corresponding to the operator console to the remote web server;
 determining, in the copied objects, references for operator input and feedback via the console at the base application;
 redirecting the determined references to the remote web client, the remote web client in communication with the remote web server by a public access mechanism;
 examining the copied objects in the remote web server to identify overloaded methods and compound display elements;
 modifying, according to design porting logic, the identified objects having overloaded methods and compound display elements for operation on the remote web server; and
 deploying the copied objects as executable objects on the server runtime engine in the web server.

11. The method of claim 1 wherein the remote deployment comprises a web server and a browser, the web server operable to include the translated objects and the server runtime engine and the browser adapted to include the client runtime engine in communication with the server runtime engine via the alternate control path, the alternate control path comprising an API portal, the API portal including an Internet connection.

12. The method of claim 1 wherein translating further comprises:
 determining, for each of the translated application objects, overloaded methods corresponding to GUI display elements; and
 resolving, for the GUI display elements, style inconsistencies in the GUI display produced by the client runtime engine.

13. The method of claim 1 wherein translating further comprises:
 determining base application objects employing compound GUI display elements;
 computing an aggregation of unary display elements consistent with the determined compound GUI display elements; and
 modifying the translated application object such that the client runtime engine employs the aggregated unary display elements.

14. A computing device having a memory, processor, and an interface for modeling, building and implementing a software application on a remote deployment system corresponding to a base application comprising:
 an interface to a set of base application objects operable to identify and access a set of objects in the base application for inclusion in the remote deployment and operable by an alternate control path;
 an object translator operable to translate the identified set of objects into a set of remote application objects parallel to the objects in the base application, the identified set of objects defining a graphical user interface operable to interact with a user, the translated set of identified objects operable for deployment on a remote server, the remote server further operable to generate, from at least a subset of the translated remote application objects, executable objects executable by a server runtime engine at the remote server, the server runtime engine operable to generate transportable objects corresponding to the generated executable objects, the transportable objects further operable to generate, via the alternate control path, GUI executable objects on a remote client runtime engine, the remote client runtime engine responsive to the transportable objects to generate the corresponding GUI executable objects, the object translator further comprising:
 a label mapper operable to generate a corresponding remote application object for each identified object in the base application, the generated remote application object operable for execution in the remote deployment; and
 an object classifier, wherein the set of objects in the base application further comprises GUI objects and processing objects, the object translator operable to determine, if the object is a GUI object or a processing object.

15. The computing device of claim 14 further comprising an object classifier in the object translator, wherein the set of objects in the base application further comprises GUI objects and processing objects, and wherein the object translator is operable to:
 determine, if the object is a GUI object or a processing object; and
 if the object is a GUI object, operable to generate a reference to the server runtime engine.

16. The computing device of claim 15 wherein the object translator further includes an association manager operable to:
  identify, via an association manager in the object translator, associations between the remote application objects and the GUI display elements; and
  store, in an associated object table, the identified associations.

17. The computing device of claim 16 wherein the associations are further indicative of relationships between GUI elements and the executable objects in the server runtime engine.

18. The computing device of claim 16 wherein the associations are further indicative of associations between the remote application objects and external references in a data source.

19. The computing device of claim 18 wherein the associations are further indicative of references between manageable entities indicated in the SAN management server database.

20. The computing device of claim 18 wherein the base application is a SAN management application, the data source is a SAN management server and the external references are indicative of a manageable entity in the SAN, the SAN management server operable to store and retrieve information about the manageable entities in the SAN.

21. The computing device of claim 14 wherein the object classifier is further operable to identify, from the set of objects in the base application, GUI objects and processing objects, the GUI objects responsible for producing GUI display elements including at least one of GUI screens, GUI icons, GUI controls, GUI buttons and GUI selections.

22. The computing device of claim 14 wherein the base application further includes a data source interface to an external data source, and translating further comprises identifying object references from the translated remote application objects into the data source, the data source responsive to the corresponding object reference.

23. The computing device of claim 22 wherein the base application is a storage area network (SAN) management application and the data source is a SAN management server having a database of manageable entities (ME) for providing storage data services via the SAN, each of the manageable entities responsive to the SAN management application and further wherein the GUI elements represent SAN elements, the SAN elements corresponding to the manageable entities in the SAN and the transportable objects for reporting status of the manageable entities from corresponding agent components in the SAN, each of the agent components corresponding to at least one manageable entity, the agent components further responsive to the return transportable objects for managing the manageable entities in the SAN.

24. The computing device of claim 14 wherein the remote deployment comprises a web server and a browser, the web server operable to include the translated objects and the server runtime engine and the browser adapted to include the client runtime engine in communication with the server runtime engine via the alternate control path, the alternate control path comprising an API portal, the API portal including an Internet connection.

25. The computing device of claim 14 wherein the object classifier further includes an overload parser operable to:
  determine, via the overload parser in the object classifier, for each of the translated application objects, overloaded methods corresponding to GUI display elements; and
  resolve, for the GUI display elements, style inconsistencies in the GUI display produced by the client runtime engine.

26. The computing device of claim 14 wherein the association manger further includes a display element validator operable to:
  determine base application objects employing compound GUI display elements;
  compute an aggregation of unary display elements consistent with the determined compound GUI display elements; and
  modify, via the display element validator, the translated application object such that the client runtime engine employs the aggregated unary display elements.

27. A computer program product having a computer readable storage medium operable to store computer program logic embodied in an encoded set of processor based instructions defined as computer program code encoded thereon and executable by a processor responsive to the instructions for modeling, building and implementing a software application on a remote deployment system corresponding to a base application comprising:
  computer program code for identifying a set of objects in the base application for inclusion in the remote deployment and operable by an alternate control path;
  identifying, from the set of objects in the base application, GUI objects and processing objects, the GUI objects responsible for producing GUI display elements;
  computer program code for translating, via an object translator, the identified set of objects into a set of remote application objects parallel to the objects in the base application, the identified set of objects defining a graphical user interface operable to interact with a user;
  wherein translating comprises generating, via a label mapper in the object translator, a corresponding remote application object for each identified object in the base application, the generated remote application object operable for execution in the remote deployment;
  computer program code for deploying the translated remote application objects on a remote server; and
  computer program code for generating, from at least a subset of the translated remote application objects, executable objects executable by a server runtime engine at the remote server, the server runtime engine operable to generate transportable objects corresponding to the generated executable objects, the transportable objects further operable to generate, via the alternate control path, GUI executable objects on a remote client runtime engine, the remote client runtime engine responsive to the transportable objects to generate the corresponding GUI executable objects, translating further comprising:
  identifying, via an association manager in the object translator, associations between the remote application objects and the GUI display elements; and
  storing, in an associated object table, the identified associations.

28. An encoded set or processor based instructions on a computer readable storage medium defined as program code executable by a processor responsive to the instructions computer data signal for modeling, building and implementing a software application on a remote deployment system corresponding to a base application comprising:
  program code for identifying a set of objects in the base application for inclusion in the remote deployment and operable by an alternate control path;

program code for translating, via an object translator, the identified set of objects into a set of remote application objects parallel to the objects in the base application, the identified set of objects defining a graphical user interface operable to interact with a user;

wherein translating comprises generating, via a label mapper in the object translator, a corresponding remote application object for each identified object in the base application, the generated remote application object operable for execution in the remote deployment;

program code for deploying the translated remote application objects on a remote server; and program code for generating, from at least a subset of the translated remote application objects, executable objects executable by a server runtime engine at the remote server, the server runtime engine operable to generate transportable objects corresponding to the generated executable objects, the transportable objects further operable to generate, via the alternate control path, GUI executable objects on a remote client runtime engine, the remote client runtime engine responsive to the transportable objects to generate the corresponding GUI executable objects.

29. A computing device having a memory, processor, and an interface for modeling, building and implementing a software application on a remote deployment system corresponding to a base application comprising:

means for identifying a set of objects in the base application for inclusion in the remote deployment and operable by an alternate control path;

means for translating, via an object translator, the identified set of objects into a set of remote application objects parallel to the objects in the base application, the identified set of objects defining a graphical user interface operable to interact with a user, the means for translating comprising means for generating, via a label mapper in the object translator, a corresponding remote application object for each identified object in the base application, the generated remote application object operable for execution in the remote deployment;

means for deploying the translated remote application objects on a remote server; and means for generating, from at least a subset of the translated remote application objects, executable objects executable by a server runtime engine at the remote server, the server runtime engine operable to generate transportable objects corresponding to the generated executable objects, the transportable objects further operable to generate, via the alternate control path, GUI executable objects on a remote client runtime engine, the remote client runtime engine responsive to the transportable objects to generate the corresponding GUI executable objects, the set of objects in the base application further comprising GUI objects and processing objects, the means for translating further comprising:

means for determining, via an object classifier in the object translator, if the object is a GUI object or a processing object; and means for generating, if the object is a GUI object, a reference to the server runtime engine, means for identifying, via an association manager in the object translator, associations between the remote application objects and the GUI display elements; and means for storing, in an associated object table, the identified associations, the base application further including a data source interface to an external data source, the means for translating further comprising:

means for identifying object references from the translated remote application objects into the data source, the data source responsive to the corresponding object reference, wherein the base application is a SAN management application, the data source is a SAN management server and the external references are indicative of a manageable entity in the SAN, the SAN management server operable to store and retrieve information about the manageable entities in the SAN.

* * * * *